D. L. GEER.
Improvement in Rice Cleaners.
No. 123,165. Fig. 1. Patented Jan. 30, 1872.
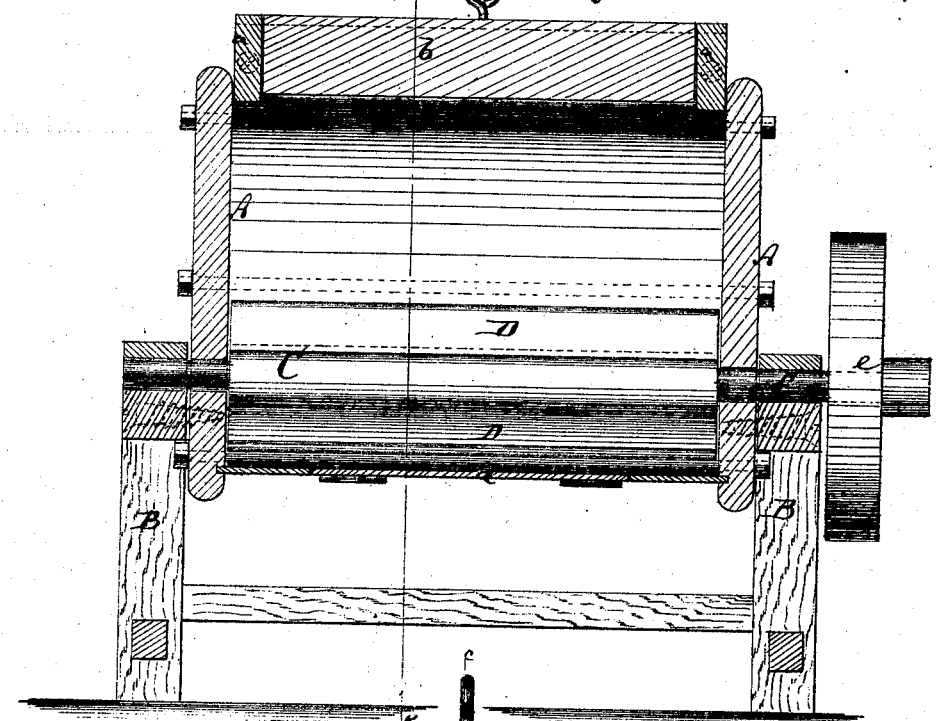
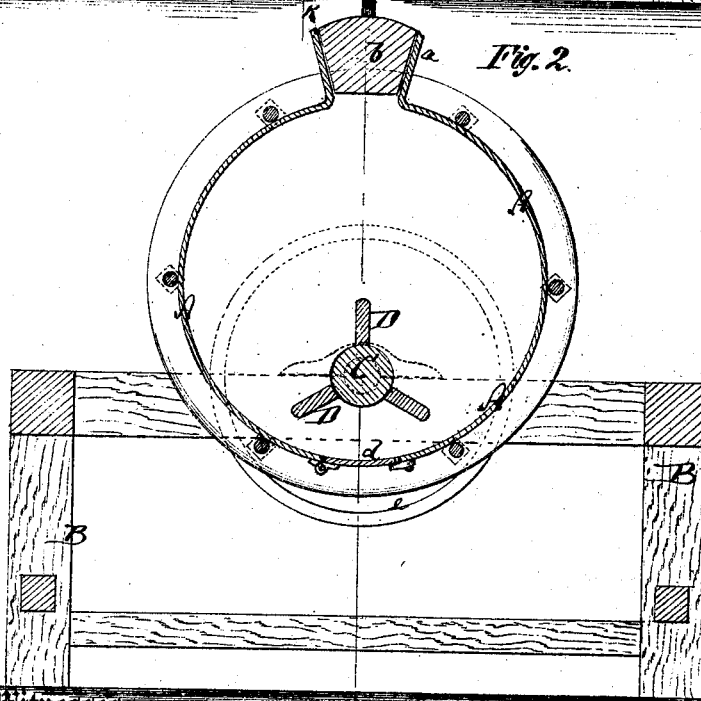
Witnesses:
P. C. Dieterich
Francis McArdle
Inventor:
D. L. Geer
Per
[signature]
Attorneys.

UNITED STATES PATENT OFFICE.

DAVID L. GEER, OF LAKE CITY, FLORIDA, ASSIGNOR OF ONE-THIRD HIS RIGHT TO JESSE CARTER, OF SAME PLACE.

IMPROVEMENT IN RICE-CLEANERS.

Specification forming part of Letters Patent No. 123,165, dated January 30, 1872.

*To all whom it may concern:*

Be it known that I, DAVID L. GEER, of Lake City, in the county of Columbia and State of Florida, have invented a new and Improved Rice-Cleaner; and I do hereby declare that the following is a full, clear, and exact description thereof, which will enable others skilled in the art to make and use the same, reference being had to the accompanying drawing forming part of this specification.

Figure 1 represents a side view, partly in section, of my improved rice-cleaner, the line *c c*, Fig. 2, indicating the plane of section. Fig. 2 is a vertical transverse section of the same on the line *k k*, Fig. 1.

Similar letters of reference indicate corresponding parts.

This invention has for its object to produce a machine whereby rice can be rapidly and thoroughly cleaned, after having been hulled in the ordinary manner; and consists in the employment of a shaft carrying projecting wings or friction blades within a stationary drum or cylinder.

A, in the drawing, represents a cylinder, made of sheet-metal or other suitable material, of requisite size and rigidity, secured in a horizontal position to a supporting-frame, B. A hopper, *a*, is formed on top of the cylinder for receiving, and a discharge-opening at the bottom of the cylinder for discharging the rice. The hopper can be closed by a cover, *b*, and the discharge-opening by a hinged plate, *d*. C is a horizontal shaft, having its bearing in the ends of the cylinder A, and provided outside of said cylinder with a pulley, *e*, or other means whereby it can be revolved. The shaft is below the axis of the cylinder, so as to be eccentric therein, as shown. D D are projecting wings or blades on the shaft C within the cylinder. The wings extend along the entire shaft between the cylinder-heads, and are of such width as to nearly sweep the bottom of the cylinder when the shaft is revolved.

When the rice has been hulled by the usual method it is conveyed to the hopper *a*, whose cover is opened so that the rice will flow into and fill the cylinder. The shaft C is then revolved. The motion of the blades causes the rice to circulate in the space around them, and by its own weight and pressure a friction is produced that cuts off the germs and membranous coatings or skin, producing what is called rice-flour. When the process has been continued until the flour has been removed, the rice presents a flinty, white, smooth appearance. The door *d* is next opened and the rice passes out.

By this machine the rice is thoroughly cleaned, and the breaking of the grain, so frequent with the use of the ordinary mortar and pestle, prevented. The friction in my machine will also clear the rice of any hulls or chaff that may have adhered to it after the hulling process. In fact, the machine may, if proper time is allowed, be used for hulling as well as cleaning.

Having thus described my invention, I claim as new, and desire to secure by Letters Patent—

The cylinder A, provided with covered hopper *a b* at the top and hinged door *d* at the bottom, in combination with a revolving shaft, C, having blades D D D, when all said parts are arranged with respect to each other and on a frame, B, as and for the purpose described.

DAVID L. GEER.

Witnesses:
A. B. HAGEN,
S. L. NIBLACK.